United States Patent [19]

Iguchi et al.

[11] Patent Number: 4,959,275

[45] Date of Patent: Sep. 25, 1990

[54] PROCESS AND EQUIPMENT FOR MICRO-PATTERN FORMING ON ROLL SURFACE, METAL SHEETS FOR PRESSWORKING PREPARED BY THE ROLL, AND METHOD OF PREPARING SAME

[75] Inventors: Takaaki Iguchi; Takanori Tamari; Takaaki Hira; Kunio Isobe; Ikuo Yarita; Hideo Abe, all of Chiba, Japan

[73] Assignee: Kawasaki Steel Corporation, Hyog, Japan

[21] Appl. No.: 339,123

[22] Filed: Apr. 17, 1989

[30] Foreign Application Priority Data

Apr. 22, 1988 [JP] Japan ................................. 63-98296
Jun. 29, 1988 [JP] Japan ............................... 63-159493
Sep. 5, 1988 [JP] Japan ............................... 63-220451

[51] Int. Cl.$^5$ ..................... B21D 13/00; B31F 1/07; B44C 1/22; C232 1/02
[52] U.S. Cl. ........................ 428/603; 101/32; 156/659.1; 156/345; 156/905; 219/121.69; 428/174; 428/179; 428/187
[58] Field of Search ............... 156/626, 640, 643, 656, 156/658, 659.1, 664, 345, 905; 427/53.1; 219/121.6, 121.61, 121.67, 121.68, 121.69, 121.83, 121.85; 428/603, 604, 612, 174, 179, 187; 101/5, 22, 28, 32

[56] References Cited

U.S. PATENT DOCUMENTS

| | | | |
|---|---|---|---|
| 2,684,291 | 7/1954 | Wilson et al. | 156/660·X |
| 2,854,336 | 9/1958 | Gutknecht | 156/661.1 X |
| 3,048,512 | 8/1962 | Nelson | 156/660 |
| 4,213,819 | 7/1980 | Werthmann | 156/905 X |
| 4,321,105 | 3/1982 | Melonio et al. | 156/905 X |
| 4,504,354 | 3/1985 | George et al. | 156/905 X |

Primary Examiner—William A. Powell
Attorney, Agent, or Firm—Austin R. Miller

[57] ABSTRACT

A process and an equipment for micro-pattern forming on the surface of a rolling roll, and a metallic thin sheet and preparation thereof by transferring a micro-pattern on the surface by use of the roll are provided. Such a rolling roll can be attained by a method wherein resin film mixed with optical absorbing agent is formed on the surface, a Q switch YAG laser having an output of 5 to 100W is applied to make a marking on this resin film, a part of the coated film is removed in strict accordance with the pattern, then an etching process is applied to the roll surface. The metallic thin sheet skin pass rolled by this roll is used as a car panel and is superior in pressworkability and sharpness of reflections.

11 Claims, 18 Drawing Sheets

PROCESS AND EQUIPMENT FOR MICRO-PATTERN FORMING ON ROLL SURFACE, METAL SHEETS FOR PRESSWORKING PREPARED BY THE ROLL, AND METHOD OF PREPARING SAME

BACKGROUND OF THE INVENTION:

1. Field of the Invention

The present invention relates to a process and equipment for micro-pattern forming on the surface of a rolling roll in forming a precise pattern having a number of projections and indentations in the same surface, metal sheets obtained through the rolling roll which are to be pressed and painted like outer panels of automobiles for example, and a method of preparing the metal sheets.

2. Prior Art

The beautiful appearance of a car body has recently come to be keenly demanded. Actually, a car body indistinctly reflecting a surrounding scene in the surface thereof is becoming no longer appealing to car owners; that is, the car owners demand a car that sharply reflects a surrounding scene in the body surface. The sharpness of reflection of the scene thus reflected in the body surface is evaluated by a DOI value by measuring the rate of reflection of a slit light that has entered the surface of the car body at a given angle. The larger the value thus obtained, the higher the sharpness of reflection in the car body surface.

Nowadays, there is adopted a method of forming a number of projections and indentations in the surface of a rolling roll by projecting pulses of a laser beam directly to the surface of the roll, and transferring a pattern of the projections and indentations from the roll surface to the surface of a cold-rolled steel sheet by the use of a roll having projections and indentations formed therein, in a skin pass rolling process after the annealing of the steel sheet.

A dull-surface skin pass rolling roll with the surface roughened by forming projections and indentations by shot blasting has been popularly used in skin pass rolling, thereby transferring a pattern of projections and indentations to the surface of the steel sheet, and steel sheets thus obtained are used as a material for pressworking.

The pattern with projections and indentations formed in the roll surface by the use of a laser beam differs from that formed through a conventional shot blasting process or an electrical-discharge dulling process. The projections and indentations are uniform in size and formed at a fixed pitch throughout the roll surface. Therefore, steel sheets processed by this process and painted have the advantage that the surface thereof has better sharpness of reflection, and has excellent resistance to die galling at the time of pressing.

Prior art disclosed in Japanese Patent LaidOpen Nos. 55-94790 and 56-119687 and Japanese Patent Publication No. 58-25557 are the processes described above or variations thereof.

Conventional laser beam machining technology has the following problems.

(1) Since the laser bean is directly applied to the roll surface to make indentations, a laser-beam oscillator is required to put out a high power of 1 kW or more for efficient machining of a work, such as a rolling roll having a wide surface area. It is, therefore, natural to adopt a $CO_2$ laser. This $CO_2$ laser, however, is of a large size and needs larger maintenance costs and labour.

(2) In the pattern of projections and indentations thus produced by such a laser-beam machining equipment, each indentation is likely to become a ring-like or of similar form with molten metal deposited around it. It is therefore impossible to form a pattern of projections and indentations into a free shape.

(3) The pattern of projections and indentations formed by melting the metal with a laser beam is composed of austenite in the projection-indentation section. A roll having projections and indentations thus formed has low wear resistance when used in rolling.

(4) The diameter of each indentation of the pattern of projection and indentation is determined by the diameter of the laser beam converged by a condenser. This diameter can not physically be decreased below about 100 $\mu$m because of the long (10.6 $\mu$m) wavelength of the $CO_2$ laser beam.

(5) To insure efficient machining of a wide surface area, it is necessary to produce a laser beam of very high-frequency pulse wave. In the case of the $CO_2$ gas laser, however, this can not be realized by electrical means such as Q switching. Accordingly, a mechanical chopper has been used for this purpose. This method, however, also has a problem that high mechanical chopper and roll speeds and phases do not necessarily match each other and the pattern obtained has projections and indentations irregularly arranged.

As a means to solve the above-mentioned problems, a photo-etching method used in pattern forming on roll surface in a gravure printing machine is adopted.

This photo-etching process is adopted to produce a rolling roll having a roughened surface with a uniform projection and indentation pattern. Steel plates manufactured by use of the roll have excellent pressworking and decorative properties as long known, for example as disclosed in Japanese Patent Publication Nos. 41-14973 and 46-19535. However, this process has not yet been put into fully practical use because of its low roll processing efficiency and very high cost.

The photo-etching process, as well known, may be broken down into the following steps.

(1) Activation of roll surface
(2) Application of resist (photosensitive corrosion-resistant agent)
(3) Drying
(4) Film affixing
(5) Exposure to light
(6) Removal of film
(7) Development
(8) Drying
(9) Etching
(10) Removal of resist
(11) Post-treatment (washing, neutralization, etc.)

This photo-etching process can be used to form a pattern of fine projections and indentations on a rolling roll. Particularly in processing a large roll, such as the rolling roll, however, the aforementioned process requires not only many manhours but operation in a darkroom, and moreover since it is difficult to adopt automatic operations, the process is extremely disadvantageous in manufacturing costs as compared with the aforesaid shot-blasting process or laser beam machining process.

Japanese Patent Publication No. 62-11922 discloses a process for covering a sheet surface with an acid corrosion-resistant material, locally destroying the coated surface with a laser beam, and chemically etching the locally uncovered spots. This process, however, is still too premature to be practically adopted as a substantial process.

Next, steel sheets provided with projections and indentations will be described.

In Japanese Patent Publication No. 62-11922 and Japanese Patent Laid-Open No. 62-168602 is disclosed a laser-beam dulling process wherein pulses of a laser beam are projected on the surface of a roll to form projections and indentations at a fixed pitch on the surface of the roll. According to the process, since regular projections and indentations can be formed at an arbitrary spacing on a bright roll, steel sheets that are skinpass rolled by the use of this roll are provided with level sections and projections and indented sections alternately and regularly. It is known that, in the level sections, no irregular reflection takes place; and higher sharpness of reflection is obtained rather in the skinpass-rolled sheets than in sheets rolled with the aforementioned shot-blasted roll.

The sharpness of reflection of a steel sheet surface before painting has been explained above. Next, the sharpness of reflection after painting will be described.

After chemical conversion treatment and electrodeposition painting, the sheets undergo painting by dip coating or spray washing. Generally, the painting process provides level projections and indentations on the steel sheet surface, thereby improving DOI as compared with the sheet before painting.

In vertical painting, such as the dip coating, a paint liquid applied to the sheet flows down the sheet surface with gravity. In this case, when there exist fixed paths along which the paint flows down, the paint can flow uniformly; if, however, there is any separated independent indentation, the flow of the paint will stop thereat, resulting in an uneven film thickness of coating.

As stated above, a steel sheet with projections and indentations having a large ratio of flat area in the surface thereof and having fixed paths that allow the uniform flow of the paint liquid is suitable for use because of the sharpness of reflection. A steel sheet manufactured by the laser-dulled roll satisfies at least the former, while a steel sheet manufactured by the shot-blasted roll can not satisfy both, resulting in a low DOI value.

Next the press workability will be described. Press working is done by first holding edges of a sheet between a die and a blank holder, applying a specific blank hold-down pressure to the sheet, and then punching the sheet at the center into a predetermined shape. Commonly, a material flows from the blank holding position into the die section immediately after pressing. This becomes an inflow characteristic, which is used as an index indicating the difficulty or ease of press working. For example, a material having great frictional resistance flows little from the die, resulting in a fracture thereof.

The surface of the steel sheet, when pressed, is commonly coated with a lubricating oil. It is important to obtain a substantial effect of this lubricating oil to prevent the fracture of the sheet.

In the meantime, there is a problem of galling in that a part of the steel sheet surface is galled by the die and coheres on a tool in case of a high frictional resistance when the steel material is in contact with, or slides on, the tool.

A steel sheet with a large level surface area has superior sharpness of reflection, but not necessarily satisfactory press working function.

SUMMARY OF THE INVENTION

It is an object of the present invention to provide a micro-pattern forming process on roll surface and an industrial equipment that can positively realize such rolls that have regularly or arbitrarily arranged projections and indentations.

It is a further object of the present invention to provide steel sheets having excellent sharpness of reflection which are provided with flat areas on the steel sheet surface and with paint paths for uniform flow of the paint liquid.

It is a further object of the present invention to provide metal sheets which can secure a lubricating oil fed at the time of pressing and efficiently supply the lubricating oil to a boundary surface in contact with the tool, and also have a projection-indentation structure having indentations in which a chafed stock of the sheet can be trapped so as not to cohere on the tool.

It is still another object of the present invention to provide a roll of such a surface structure that can manufacture steel sheets having complicated projections and indentations on the surface as described above.

The process disclosed in the present invention is a process of forming a micro-pattern on a rolling roll surface, which comprises of the following steps:

(1) Forming a film of acid corrosion resistant resin on the rolling roll surface by applying a mixture of an acid corrosion-resistant resin solution and a light-absorbing agent;

(2) Marking off a desired pattern continuously on this film of resin, using a Q switch and a YAG laser having an output of 5 to 100 W on the average, and exposing the roll surface with the pattern thus marked off; and (3) Thereafter, etching to form the desired pattern on the roll surface.

In the above mentioned process, the acid corrosion-resistant resin liquid is mixed with optical absorbing material composed of carbon black or pigment. If the thickness of resin film to be formed on the surface of the roll is 1 to 10 $\mu$m, the resin is evaporated into an accurate pattern with a laser of low output and at the same time the resin may be protected against the etching process, resulting in that the process is quite preferable.

The apparatus of the present invention for preferentially carrying out the above-mentioned process is an apparatus for use in making a roughened surface of the rolling roll provided with devices having the following functions.

(a) a roll rotating device for supporting a roll of workpiece and rotating it;

(b) a coating device which is similar to a spray device or a similar device installed at a side of the above-mentioned roll rotating device so as to apply resin substance to the surface of a roll while the resin is in its liquid state;

(c) a laser plotter comprising, in combination, an oscillator having an output of 5 to 100 W and generating a pulse-like laser in response to an electrical signal and a series of devices including a lens for use in guiding the laser to the surface of the roll and focusing it on a mirror;

(d) an etching device comprised of a spray or the like for use in blowing etching liquid to the surface of the roll processed with the abovementioned laser plotter (e) a moving device for use in moving in an axial direction of a roll the above-mentioned coating device, laser plotter and etching device independently or simultaneously;

(f) an image processing device for making a desired pattern to be formed on the surface of the roll, dividing the pattern into dots to make a binary encoded value and then for producing a series of plot data; and (g) a control device including a detector device for use in detecting a rotational angle of the roll and instructing a pulse generating timing of the above-mentioned laser plotter on the basis of a signal sent from the detector and the plotted data.

The apparatus of the present invention is further provided with the following components in addition to the above arrangement.

That is to say, the laser oscillator of the laser plotter is a YAG laser, a first optical modulator is placed within the laser oscillator to make a Q switch oscillator, a second optical modulator is placed midway of a laser optical path ranging from the oscillator to the machining part of the laser oscillator, and a series of optical units composed of a mirror and a lens for guiding the laser beam to the surface of the roll and collecting the laser beam, wherein the detector for detecting the rotational angle of the machined roll is a rotary encoder connected to a rotating shaft of the roll rotating device, and the control device is comprised of an optical modulator driver for driving the above-mentioned first optical modulator in response to a clock signal of a rotary encoder and an optical modulator driver for driving the above-mentioned second optical modulator in response to a signal taking out a clock of a part corresponding to a dot required for forming the above-mentioned image from the clock signal in reference to the plotted data.

In addition, the present invention relates to a metallic sheet for use in press forming which has a minute pattern composed of independent pond-like indentations and a minute pattern composed of continuous groove like concave portions at its surface. The independent pond-like indentations are of a large number of arranged indentations, they may have a surface pattern in which a continuous net-like indentation encloses a circumference of each of the indentations, and the portion where the pond-like indentations are arranged and another portion where a net-like indentation is arranged may be placed at separate positions. The roll for use in press forming such a metallic sheet as described above has independently or commonly a surface pattern composed of independent trapezoid projections with a flat top surface and a surface pattern composed of continuous net-like projections with a top flat surface.

It is possible to manufacture the above-mentioned metallic sheet for use in press forming by using a roll having an independent trapezoid projection and another roll having a continuous net like projection of these rolls as above and skin pass rolling each of the metallic sheets once.

DESCRIPTION OF THE PREFERRED EMBODIMENTS

Figure 1:
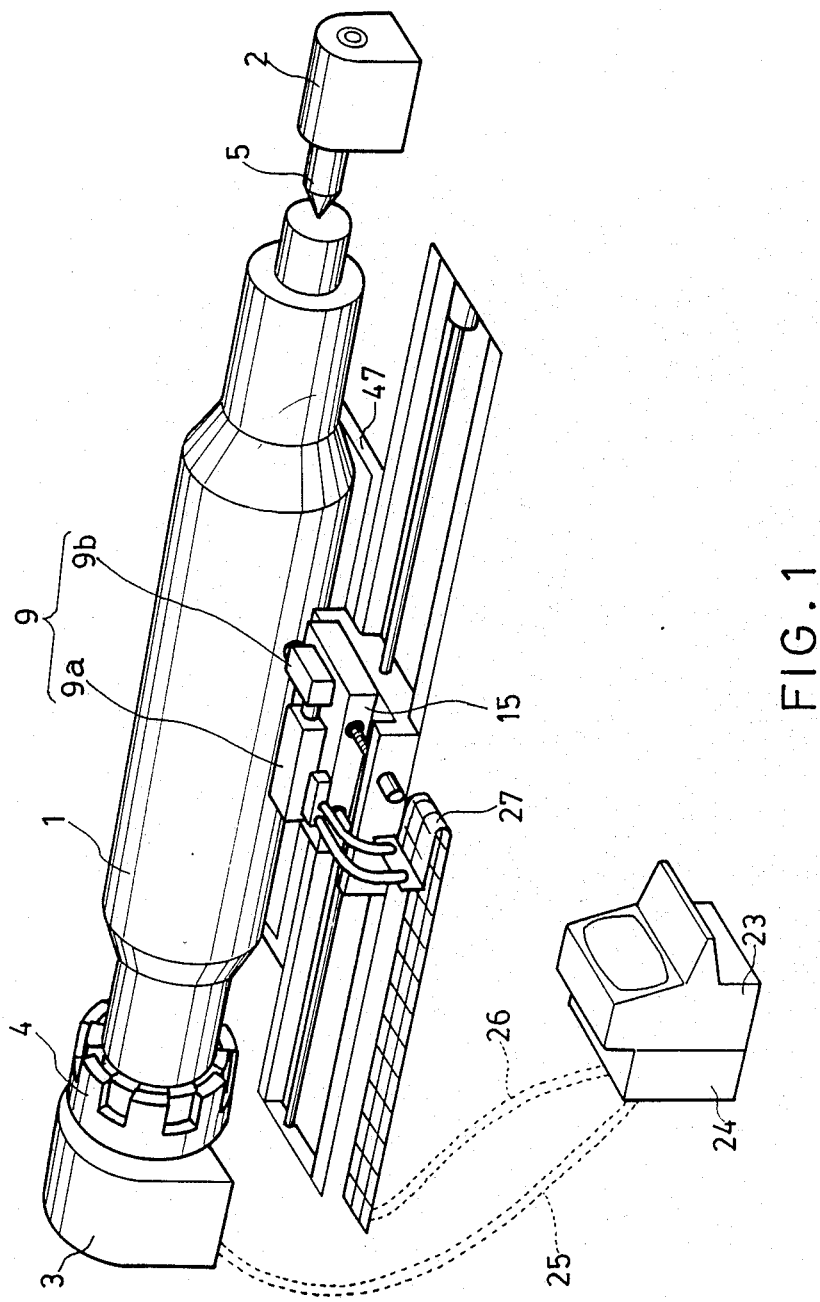
FIG. 1 is an overall perspective view, taken from a front side of a preferred embodiment of the device of the present invention.

It is an important feature of the present invention to achieve efficient evaporation and removal of a resin film formed on a surface of a rolling roll. That is to say, the resin film on which a laser beam is radiated is evaporated and removed without having any remaining molten film, and further surplus heat must be prevented from being spread over and around the formed fine holes (dots) to form a thermally influenced part and to make a vague contour of each of the dots.

In view of the fact described above, the present invention includes the feature that as a laser, a Q switched YAG laser is used and that an optical absorbing agent is mixed with the resin used in order to increase the rate of absorption of the laser beam. The Q switch is a means for making a pulse in which the radiation time per single pulse is quite short, and peak power is increased by a value corresponding to the shortened time in case of making pulsation of the laser. With this arrangement, the heating time of the irradiation part is quite short and its thermal conducting time is short, resulting in that the fed optical energy is not dispersed through thermal conduction, is locally concentrated. As a result, it is possible to make efficient evaporation of the resin and further to reduce expansion of the thermally influenced part around it. In general, since a quite high frequency of pulse is required in view of the efficiency of the forming operation, the laser is required to provide a certain high output. Accordingly the laser to be used in this case is most preferably a YAG laser of a so-called continuous exciting Q-switch type. The above-mentioned laser has a advantage that a high frequency pulse of several 10 kHz at a high output of 5 to 100 W can be attained and further the pulse is easily applied as a short pulse through a Q switch. In addition, the wave length of the YAG laser is 1.06 $\mu$m which is 1/10 of the wave length of a $CO_2$ laser and a minimum spot diameter which can be metered by a condenser can be reduced to about 10 $\mu$m, resulting in the effect that a fine pattern of projections and indentations can be freely formed. When this wave length is near that of visible light and its absorbing rate in a normal resin is low, the resin may not be machined. In view of this fact, desired object can be easily attained by mixing the resin with an optical absorbing material and applying them both. In this case, as the optical absorbing material, either a carbon black or a pigment is preferable.

According to the experiments performed by the inventors of the present invention, in case the resin mixed with the above-mentioned optical absorbing material is used, it is preferable to have a film thickness of about 1 to 10 $\mu$m when a YAG laser of 100 W or so is used. This is due to the fact that a through-pass hole in a resin film is formed in a reverse conical shape through the laser, resulting in that a too thick film may not cause a hole (dot) having a sufficient diameter to be formed and in turn if a spraying method is applied, a film thickness less than 1 $\mu$m is hardly formed with a uniform thickness.

It is preferable to use a coating of normal temperature drying type due to the fact that a drying and baking step in case of performing a coating operation is eliminated.

In the method of the present invention, either carbon black or a pigment is added as an absorbing material to the anti-oxidization corrosionresistant resin film, so that it is possible to evaporate this resin film with a YAG laser beam having a low output and further it is also possible to expose the surface of the roll strictly in accordance with the pattern. So, it is also possible to form a pattern quite easily and accurately.

Figure 3:
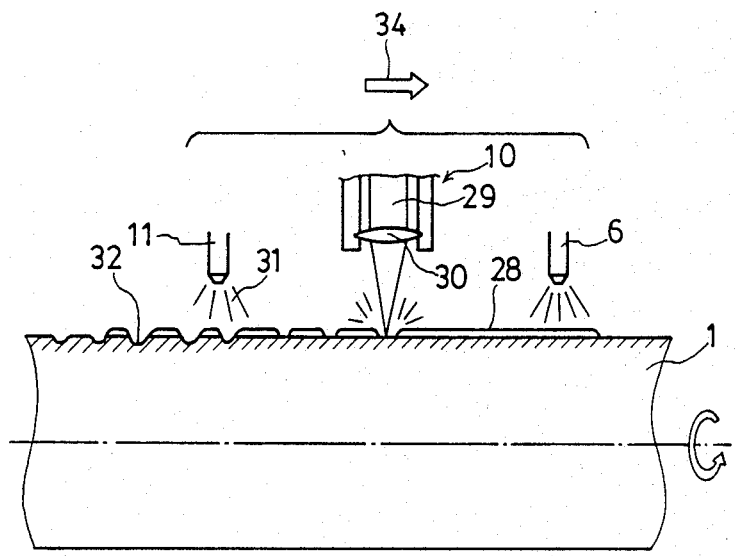
FIG. 3 is an illustrative view for showing the operation of the device of the present invention.

Referring now to FIG. 3, the method of the present invention will be described. This method is composed of the following three steps.

At first, a first step will be described.

Resin coating mixed with optical absorbing material is at first sprayed by a spray gun 6 onto a surface of a roll, the resin shows evaporation of its solvent at the surface of the roll and is solidified there, resulting in forming a thin film 28 of resin at the roll surface. If the roll 1 is rotated and the spray gun is moved in an axial direction of the roll, the thin film 28 is formed over the entire circumference of the roll 1 as he spray gun 6 is moved.

A second step of the operation will be described then.

Also in this case, the roll is kept rotating and a laser radiating head 10 (FIG. 3) is moved in an axial direction of the roll and a pulse laser beam 29 is concentrated through a lens 30 onto a predetermined location on the roll surface having the thin film 28 formed thereon and then radiated. The thin film 28 at a portion where the beam is radiated through this energy is evaporated to expose the surface of the roll 1. A row of minute holes is formed helically around a circumference of the roll 1 under rotation of the roll 1 and movement of the laser radiation head 10.

A third step of the operation of the present invention will be described.

As etching liquid 31 is sprayed by a moving spray gun 11, portions not covered by the thin film 28, i.e. only the portions radiated by the laser beam are corroded and then craters 32 are formed.

In FIG. 3 is illustrated a continuous operation from the first step to the third step as described above. However, it is optional to make independent operations unless the order of each of the operations is varied.

Figure 2:
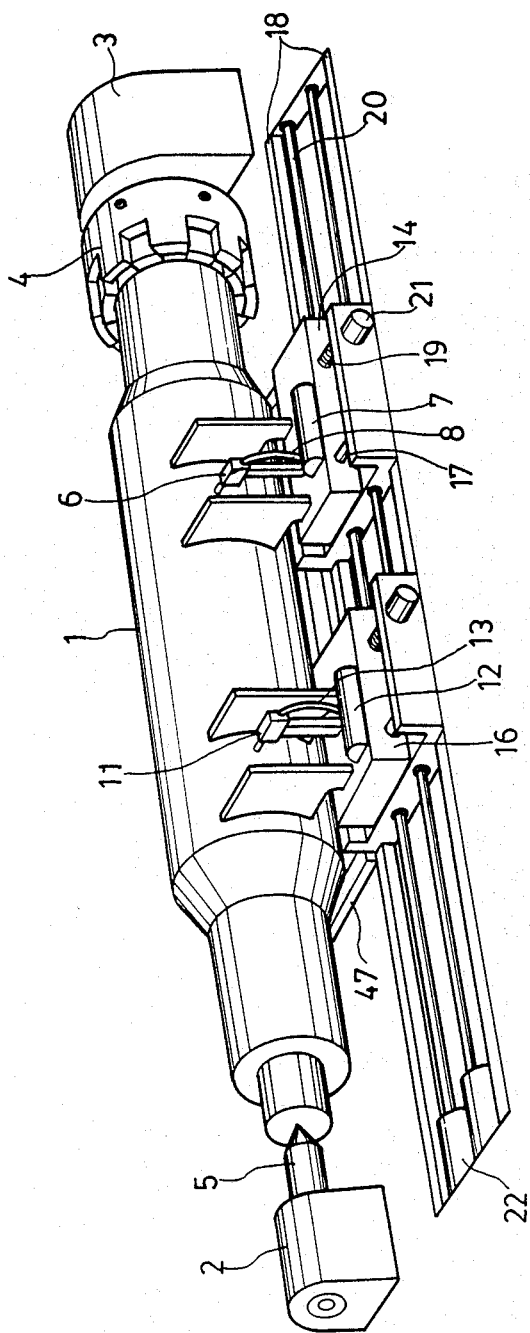
FIG. 2 is a perspective view taken from a rear surface of FIG. 1.

One example of device for practically realizing the method of the present invention will be described in reference to FIGS. 1 and 2. FIG. 1 is a perspective view taken from a front side of the device of the preferred embodiment and FIG. 2 is also a perspective view taken from a rear surface of the same. FIGS. 1 and 2 are schematic views for illustrating a technical concept of the device of the present invention. Accompanying devices which are installed actually but of which description is not required are eliminated in the illustrations.

A roll rotating device is comprised of roll supporting blocks 2 and 3, a chuck 4 and a spindle 5, and a rotating motor is provided in the supporting block 3. Both ends of the a workpiece roll 1 are supported respectively by the chuck 4 and the spindle 5. The roll is rotated by a motor (not shown).

Then, as shown in FIG. 2, as a coating device, a spray gun 6 for spraying resin coating mixed with optical absorbing material against a surface of the roll is arranged at a side part of the roll 1. To this spray gun 6 is supplied resin coating from a resin tank 7 through a tube 8.

As shown in FIG. 1, a laser plotter 9 is arranged at a side opposite to the spray gun 6. This laser plotter 9 is composed of a Q switch for producing a pulse beam in response to an electric singal sent from a control device 24 to be described later, a YAG laser oscillator 9a, and a laser radiation head 9b including an optical unit such as a mirror for guiding a laser beam to a surface of the roll and a lens for focusing the laser beam to the surface of the roll and the like.

The conventional type of the system uses a mechanical chopper. However, the number of rotation and a phase of the mechanical chopper rotated at a high speed and those of the roll do not necessarily coincide with each other and the produced pattern of projections and indentations is irregularly arranged as shown in FIG. 9.

Figure 9:
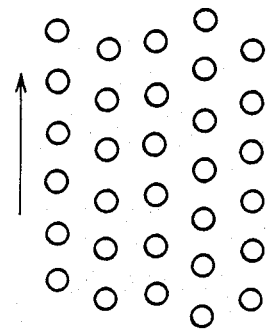
FIG. 9 is a pattern of irregular projections and indentations.
Figure 10:
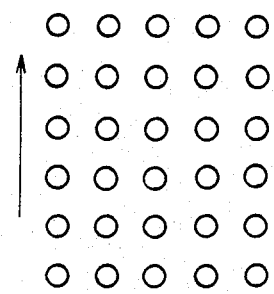
FIG. 10 is a pattern of regular projections and indentations.

In FIG. 9, the direction indicated by the arrow shows the rotational direction of the roll and another direction perpendicular to that direction indicates axial direction of the roll. The steel sheet produced through this rolling with this pattern shows the stripe pattern in a rotating direction of the roll and this is not preferable. In order to resolve this problem, it is necessary to make a regular pattern as shown in FIG. 10. In case of a method using the mechanical chopper, great accuracy is required in mechanical control such as a motor and the like, resulting in many technical problems.

Then, as shown in FIG. 2, in this example, there is provided a spray gun 11 of an etching device for use in spraying etching liquid adjacent to the coating device. The etching liquid is supplied from the tank 12 through the tube 13. A spray gun 6, a laser plotter 9 and a spray gun 11 are mounted on XY tables 14, 15 and 16, respectively. The XY tables 14, 15 and 16 have a similar structure to each other. For example, the XY table 14 can be moved in an axial direction of the roll and a direction perpendicular to the axial direction under rotations of the ball screws 19 and 20 caused by rotations of motors 21 and 22 along the guide rails 17 and 18. This table can be moved longitudinally in particular in an axial direction of the roll and the device on the XY table can act on an entire barrel of the roll 1. The Example shown in FIGS. 1 and 2 is constructed such that the laser plotter is mounted on one side of the roll and each of the coating device and the etching device is mounted at the opposite side on each of the independent XY tables. This arrangement is optional and any XY table can be used in common. However, it is preferable to mount the spray gun 6 at a side opposite to the laser plotter 9 in order to protect the laser plotter 9 having optical equipment therein against mist of etching liquid. The coating and etching liquid sprayed from the spray guns 6 and 11 are recovered into a waste liquid tank 47. An image processing device 23 may produce a pattern to be etched on the surface of the roll 1, make a binary coding from it and then generate a series of plot data. A control device 24 may receive a pulse signal from a detector of rotational angle through a cable 25 which is composed of a rotary encoder (not shown) assembled in the roll supporting block 3, transmit a signal to said laser resonator 9a through a cable 26 and a cable bar 27 in order to radiate a laser onto a predetermined single point on the surface of the roll 1 specified by the above-mentioned plot data in response to the received pulse signal and then form a predetermined pattern.

Since the apparatus of the present invention is constructed as above, it performs less steps than that of the above-mentioned photo-etching process and further its manufacturing cost can be substantially reduced. In addition, it is a feature of the present invention to enable the above-mentioned series of operations to be easily and automatically carried out.

Since the thin film 28 upon completion of the etching process is not needed, it is possible to remove it easily with a treatment such as washing with solvent. However, this removing step may easily be carried out continuously by mounting it on the XY table in the same manner as described above.

Figure 4:
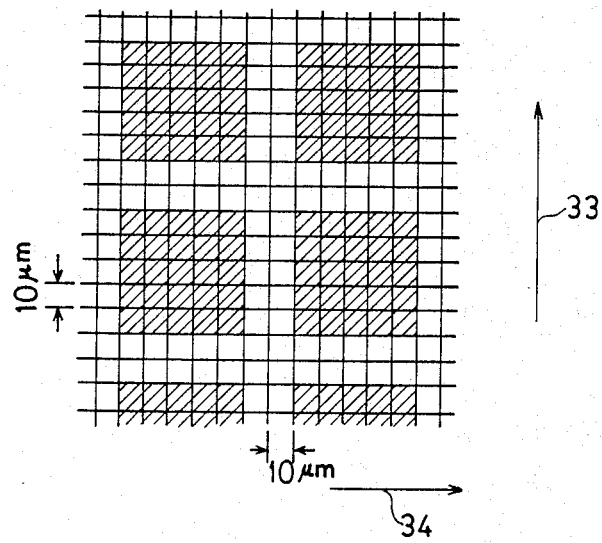
FIG. 4 is an enlarged front elevational view showing an example of a pattern of the present invention.
Figure 5:
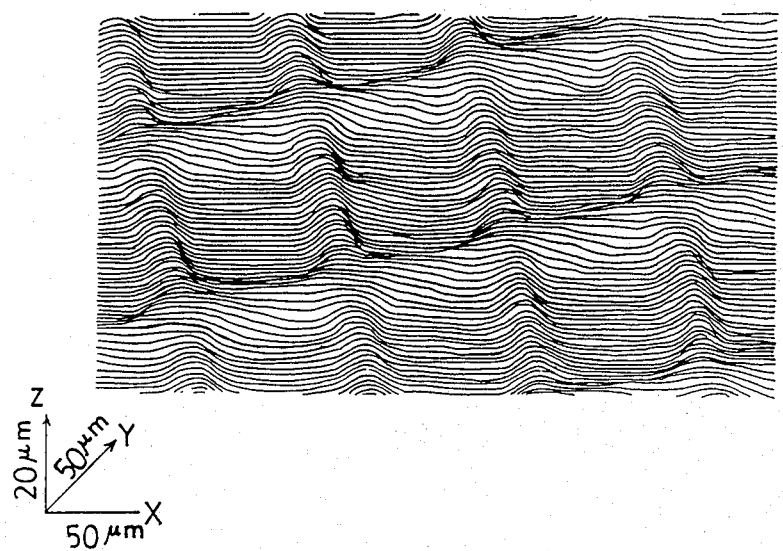
FIG. 5 is a three-dimensional roughness chart showing a shape of the surface of the roll actually manufactured by the method of the present invention.

Referring now to FIGS. 4 and 5, a process for forming a pattern of projections and indentations to be formed on the surface of the roll 1 will be described. FIG. 4 shows one example of an enlarged front elevational view of a pattern of minute projections and indentations constructed on the surface of the roll, wherein a white background is a part not radiated with laser, i.e. a part not etched. The part indicated by hatched lines corresponds to a part irradiated with laser, i.e. a part to be etched. In FIG. 4, vertical and horizontal lines are drawn only for a sake of convenience and they are not actually present.

In FIG. 4, the rotational direction of the roll 1 is set in the vertical arrow direction 33 and a moving direction of the XY table 15 toward the axial direction of the roll is set in a lateral arrow direction 34. As described above, since a punching hole in the thin film through a laser plotter is helically formed on the circumference of the roll, regions indicated by hatched lines in FIG. 4 are formed in sequence from a left vertical row to a right vertical row.

In forming this pattern, it is necessary to make a highly accurate coincidence with the rotational speed of the roll and the ejecting timing of the pulse laser in order to eliminate displacement in position of plotted points in the adjoining rows. In the apparatus of the present invention, the rotational angle of the roll is detected by the rotary encoder and a pulse beam ejecting timing is defind by electrical means in correspondence with the detection, so that the present invention can be realized without requiring substantial accuracy in the motor for the roll rotating device.

In the present invention, it is constructed as a system in which the power of the laser oscillator does not directly melt metal on the surface of the roll, but evaporates only a resin of low melting point formed on the surface of the roll, so that the present invention does not require any high power laser such as a $CO_2$ laser. In view of this fact, the present invention is based upon the fact that a laser capable of oscillating a quite high frequency pulse beam through electric means under a superior dependability, i.e. a Q switch YAG laser in this case can be used.

FIG. 5 is a three-dimensional roughness chart showing one example of a profile of a roughened surface roll formed by the method and apparatus of the present invention. Of course, in accordance with the present invention, it is not restricted to the pattern shown in FIG. 5, but it is possible to etch a universal pattern, wherein its figure is automatically formed by the image processing device 23 and then it can be copied to the surface of the roll automatically by the laser plotter.

An important advantage of the present invention consists in the fact that steps such as development, drying and the like are eliminated and in an automatic operation as compared with that of the conventional type of photo-etching process, so that an operation of the prior art requiring eight hours per roll is finished approximately in sixty minutes. It has a superior feature in mass production and a labor saving. In addition, in accordance with the method of the present invention, work in a dark room which was required in the abovementioned photo etching process can be eliminated.

Then, a practical confiquration of the abovementioned laser plotter and its control device will be described. As already described above, the method of the present invention is carried out such that short light pulses through a Q switch are struck onto the roll in side by side arrangement to form a pattern. In this case, it is necessary to achieve highly accurate coincidence between the rotational speed of the roll and the ejection timing of the pulse laser.

Further, the above-mentioned process has a problem that the power value is irregular one in respect to a certain pulse. As apparent from an arrangement of dots in each of the rows in FIG. 4, this is due to the fact that a portion having a dot in one row and a portion having no dot are mixed with each other. Since the scanning speed is kept constant, an irregular time interval is generated between the dots. Since the energy per pulse in case of a continuous energization Q switch is dependent upon the time interval of the pulse, a pulse energy just after a portion having no dot becomes quite high and the sizes of the dots become irregular, and so the accuracy of the formed pattern is decreased.

Figure 6:
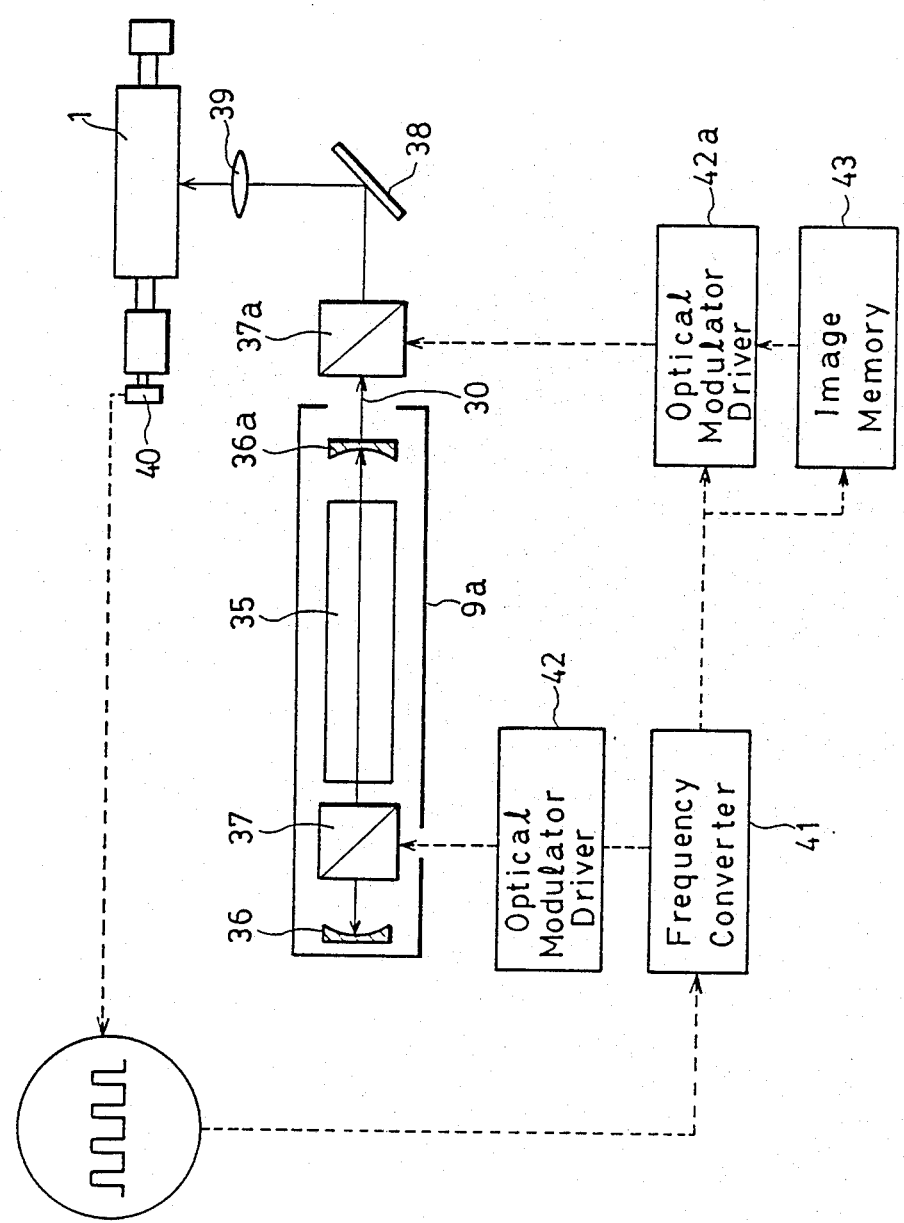
FIG. 6 is a block diagram showing a device of the present invention.

Referring now to FIG. 6, an example of a practical apparatus of the present invention will be described.

The laser oscillator 35 is a YAG rod in case of a Nd-YAG laser. The laser oscillator 35 is energized by a light from a discharging lamp not shown. A well-known laser resonator is composed of these elements, a full reflection mirror 36 and a half-mirror 36a. A first optical modulator 37 is arranged between the resonator mirrors 36 and 36a and an acoustic optical element or the like is normally used as this modulator. A Q switch oscillation is carried out by turning ON or OFF of the first optical modulator 37. A second optical modulator 37a is arranged on an optical path of a laser beam 30 out of the resonator and this is similar to the above-mentioned first optical modulator 37. The laser beam 30 passed through the second optical modulator 37a is properly changed in its optical path by a mirror 38 and the like, focused by a condenser 39 and then radiated onto the roll 1 which is the workpiece.

Then, a controlling method of the optical modulators 37 and 37a will be described. A high frequency pulse signal acting as a reference signal for getting a timing when a pulse is generated is produced by a rotary encoder 40 connected to a rotating shaft of the roll 1. Since this pulse is produced not by the rotational speed of the roll, but generated in response to the rotational angle of the roll, this is a signal which is accurately followed by rotation of the roll. This reference signal is reduced by a counter 41, for example, to a fraction of an integer as required and then converted into the number of dots for every circumference of the roll 1. At this time, the higher the high frequency of the signal from the rotary encoder 40, the higher the degree of freedom of the frequency of the signal reduced by the counter 41, resulting in that it is preferable to provide the rotary encoder 40 having a resolution as high as possible. A drive 42 for driving the optical modulator 37 is controlled directly by using a signal produced from the counter 41.

The driver 42 may generate a high frequency voltage in case the optical modulator 37 is an acoustic optical element; this signal is turned ON or OFF in response to the signal from the counter 41 to turn ON or OFF the optical modulator. Since the driver 42 is controlled by using an input signal from the counter 41, the optical modulator 37 may act to turn ON a laser at all dot positions in the surface of the workpiece 1. Then, the driver 42a for use in driving the optical modulator 37a may drive the optical modulator 37a in response to a timing signal sent from the counter 41 on the basis of data (binary encoding data) which is arranged as a form of presence or nonpresence of dots for making an image stored in the image memory 43 and formed. That is to say, the optical modulator 37a is constructed such that the laser is turned ON only at the position of the picture element at such a dot position as is required for forming an image of some images in the surface of the workpiece 1. Practically, the data is read out from the image memory 43 in response to a signal from a frequency converter 41 and then an optical modulator driver 42a is controlled by a signal having a product of the read-out data and the former data itself.

The operation of the apparatus of the present invention will be described in reference to FIG. 7.

Figure 7A:
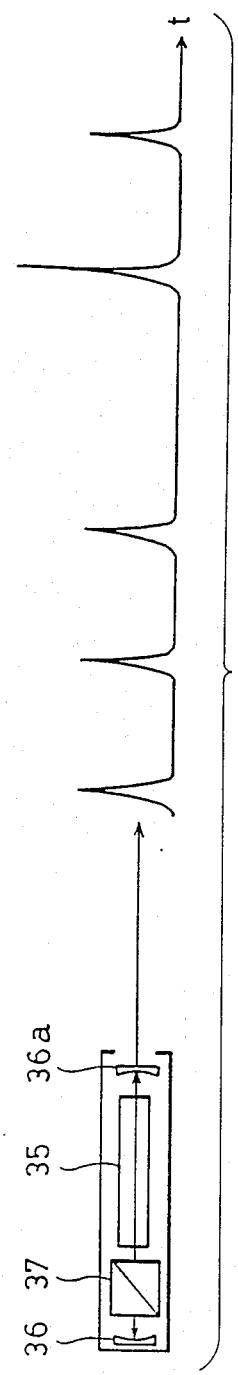
FIG. 7($a$-$d$) is a view for comparing and illustrating actions between the present invention and the prior art.

For the sake of convenience of description, a modulating process in the prior art and a wave form of laser pulse in the prior art modulation process are indicated in FIGS. 7(a) and (b). In FIG. 7(c) is illustrated a process of the present invention and a wave-form obtained through the process of the present invention.

FIG. 7(a) illustrates a case in which the optical modulator 37 is arranged between the resonator mirrors 36 and 36a which is a so-called Q switch type oscillation method. In this case, there is a certain picture element which does not require any dots for the sake of convenience of picture element itself. If the time interval of the pulse becomes an irregular one, a pulse just after the above-mentioned long interval show a high peak power as shown in FIG. 7(a), resulting in producing irregularity.

Figure 7B:
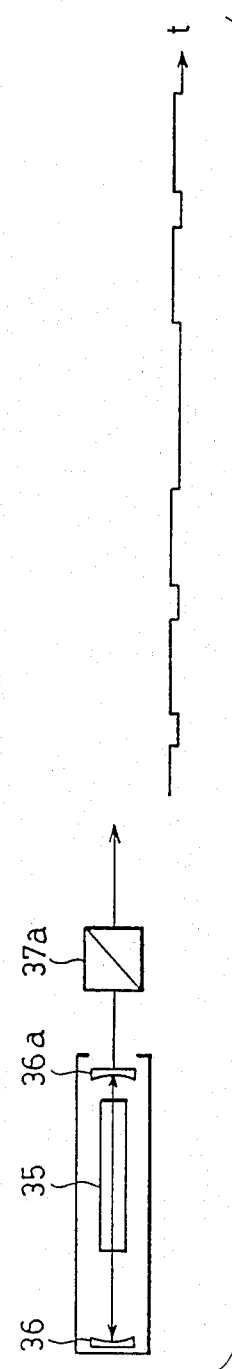
Figure 7C:
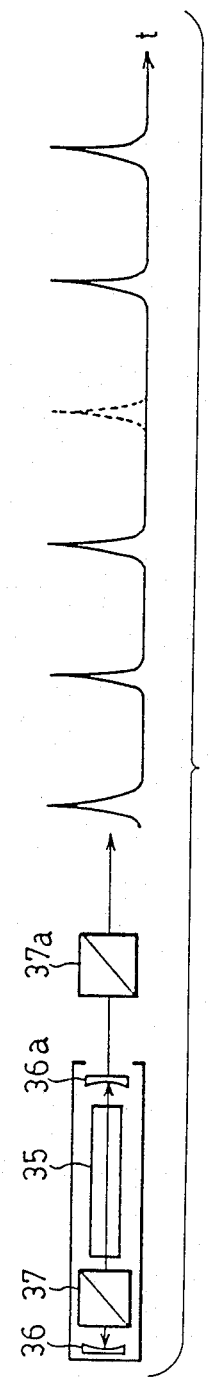

As shown in FIG. 7(b), in case an optical modulator 37a is placed outside the resonant mirrors 36 and 36a, the value of the each of pulses is regularly arranged even if there is an irregular pulse spacing. However, the peak power value is quite low, resulting in that its radiation time is extended to generate irregularity as described above.

Figure 7D:
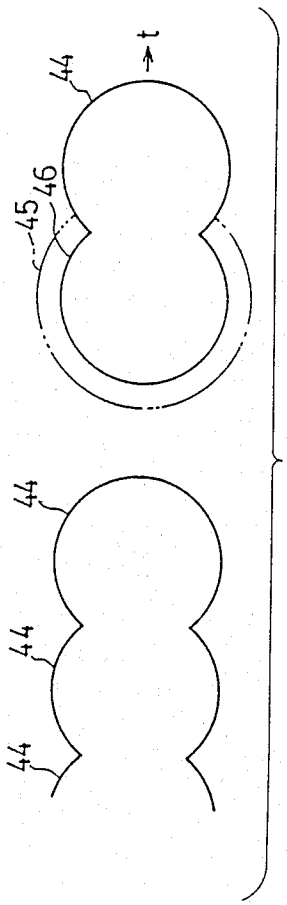

To the contrary, the process of the present invention shown in FIG. 7(c) is performed such that the optical modulator 37 turns ON the laser for all picture elements, resulting in that the laser pulse wave-form just after the mirror 36a becomes a wave-form having a linear line of FIG. 7(c) added with a dotted line, i.e. a wave-form having an equal spacing and then the peak power values are equal to each other at all pulses. In addition, non-required pulses are shielded by the optical modulator 37a, thereby a series of pulse waves having irregular spacing and equal peak power values as indicated by a solid line of FIG. 7(c) can be attained. FIG. 7(d) illustrates schematically a row of dots 44 formed by this laser pulse. In the process shown in FIG. 7(a), dots 45 have different sizes after a certain spacing is left in respect to a size of each of dots 44. However, in accordance with the process of the present invention, dots 46 which are equal in size to other dots 44 are formed.

With the above-mentioned arrangement, it is possible to achieve accurate control of a dot position during a process for machining a surface of the roll with a Q switch and a pulse of a YAG laser, to eliminate an irregular size of dots and so on accurate pattern forming can be attained.

Figure 8:
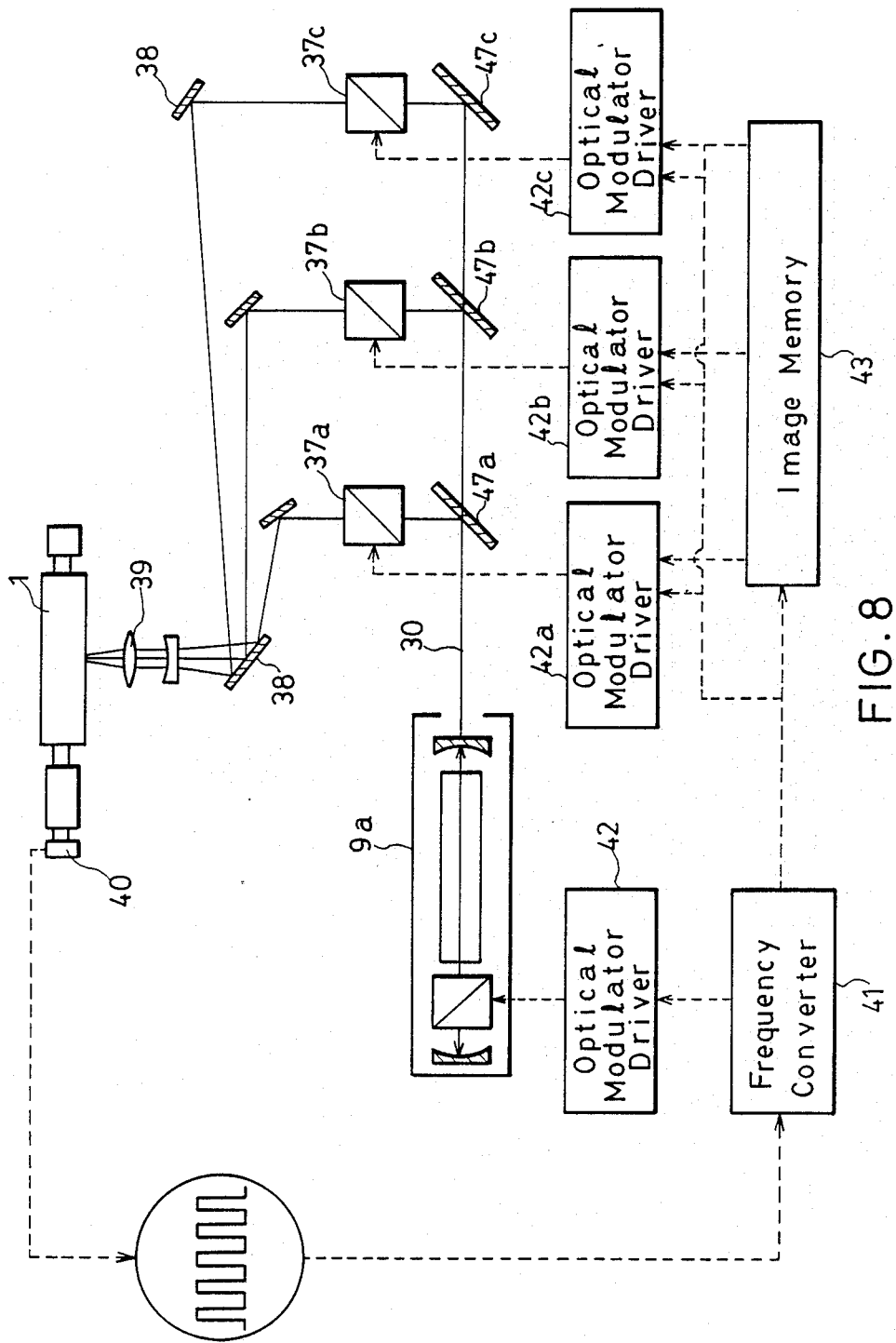
FIG. 8 is a block diagram showing another example of the device of the present invention.

As an alternative process of the present invention, as shown in FIG. 8, it is possible to provide such an arrangement as one in which a laser beam output from a resonator 9a is divided into a plurality of beams through spectroscopic mirrors 47a, 47b and 47c; each of the divided laser beams is turned ON-OFF independently through optical modulators 37a, 37b and 37c and at the same time the beam is radiated onto the surface of the roll 1. According to this process, each of the optical modulators 37a, 37b and 37c is controlled through separate data. This process is effective as a means for improving the machining speed.

The apparatus of the present invention may generate the following operations.

(a) Since the laser oscillator may evaporate a thin resin film only, it is possible to apply a high frequency pulse beam of a low output with a short wave-length, and further a finer pattern can be formed, and in addition no mechanical chopper is used, resulting in that the ON-OFF of the laser pulse can freely be controlled and a free pattern can be formed.

(b) Since roll rotation and pulse beam ejecting timing are electrically coupled, it is possible to make an accurate pattern of projections and indentations without having any pattern displacement depending upon accuracy of speed control of a motor or the like.

Since a pattern of projections and indentations is formed by an etching process, there is no austenite layer through melting at the formed projections and indentations of the roll and so the rolling roll having projections and indentations has a superior anti-wear characteristic.

(d) It has a simple step, requires no dark room work such as a photo-etching or the like, and an automatic operation can be realized and its manufacturing cost is less due to labor saving.

According to the present invention, a rolling roll is provided having various fine projections and indentations in a pattern which could not be manufactured by the conventional type of shot-blasting process or a laser processing. It can be manufactured efficiently and less expensively by a photo-etching process. In this case, accurate and finer pattern forming can be performed with the Q switch and YAG laser. Accordingly, it is possible to provide a less-expensive large amount of steel sheets which have superior surface characteristics in press forming or ornamental characteristics by using this rolling roll.

Next, the steel sheets provided with a surface pattern by applying the above-mentioned roll and its manufacturing method will be described.

As described above, the conventional roll for use in manufacturing a steel sheet having micro-patterns on its surface is surface roughened by shot blasting or a laser beam. The conventional type of roll may not accomplish the desired object of the present invention. In view of this fact, etching is applied in order to adopt it to the above-mentioned object and this etching process is applied to the rolling roll.

Figure 16:
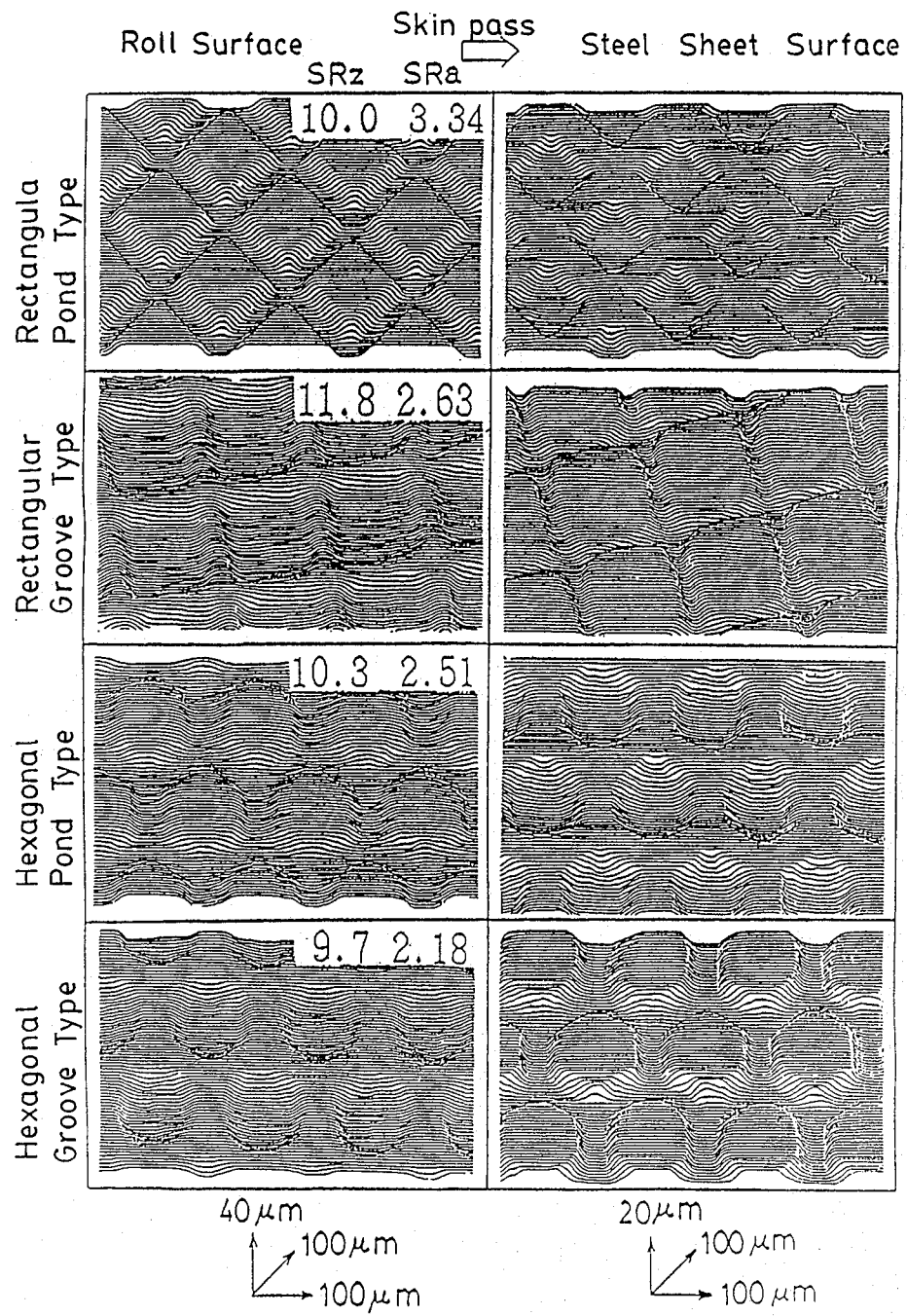
FIG. 16 is a set of views of patterns showing surfaces of rolls trially formed and showing the condition of projections and indentations in the surface of material made by the trially formed rolls.
Figure 17:
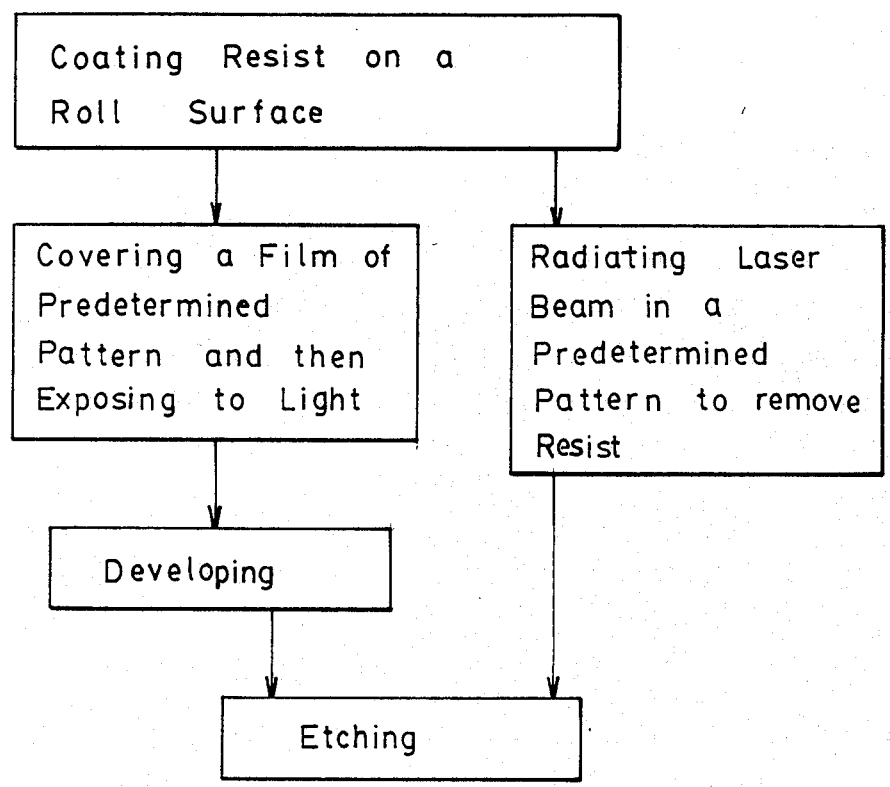
FIG. 17 is a diagram of steps showing a roll manufacturing process.

That is, as shown in FIG. 17, a resist is applied to the roll surface and coated thereon, a film having a desired pattern, for example, is applied to cover the surface, and then the roll is exposed to light and developed, thereafter an etching process is applied or a laser beam is radiated against the resist in a desired pattern to remove the resist, and then etching is performed to apply a pattern of projections and indentations on the roll as shown in FIG. 16. This roll is used to perform skin pass rolling for a cold rolled steel sheet. The pattern of projections and indentations thus obtained on the steel sheet is also shown in FIG. 16.

Checking of these shapes of projections and indentations of the roll surface apparently shows that a quite superior accurate motif with flat top projections is formed notwithstanding a comparison with FIG. 5 of Japanese Patent Publication No.62-11922 and FIG. 1 of Japanese Patent Laid-Open No.62-168602.

Figure 18:
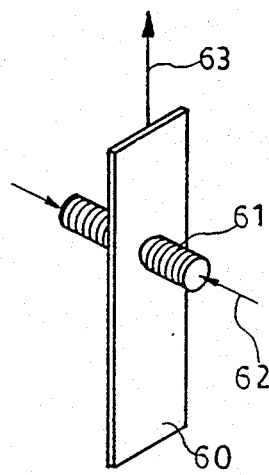
FIG. 18 is an illustrative view showing a testing method for evaluating a press machining operation.

Lubricant oil was applied to the surfaces of these steel sheets and the press machining characteristic was evaluated. The evaluation method was carried out such that, as shown in FIG. 18, 100 kgf of a pushing force was added to a tool 61 having a spherical surface with an extremity end of 20 mmR from both sides of a test piece 60 in advance, and then a sliding resistance was measured by a sliding test method for pulling out the test piece in a direction 63 perpendicular to the pushing force 62. Of course, as described above, such a test piece as one having a low resistance is superior in press forming characteristics.

Figure 19:
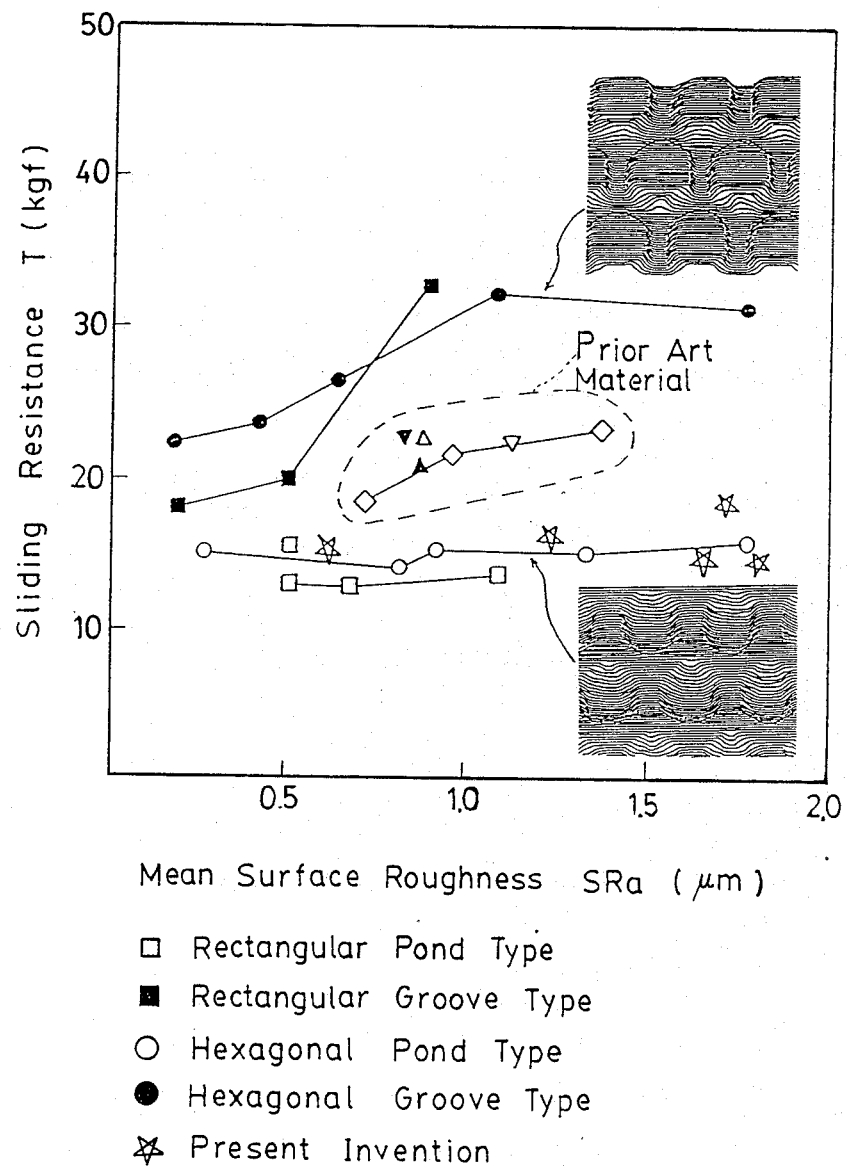
FIG. 19 is a graph showing a result of a sliding test.

In FIG. 19 is shown a result of an experiment on sliding resistance. As shown in FIG. 19, it is a feature of the present invention that the sliding resistance of a steel sheet having pond-like indentations is low and further a substantial constant sliding resistance appears without having any relation with a surface roughness Ra. In turn, in case of a pattern having groove-like indentations, sliding resistance is quite high and this sliding resistance is increased as Ra is increased. The steel sheet manufactured by the conventional type of shot blast or a roll provided with projections and indentations through a laser dulling process is illustrated in the figure as an example of comparison (the material processed by the prior art). These are positioned at an intermediate part of the steel sheet having surface indentations such as the abovementioned pond-like or groove like indentations. This mechanism can be understood as follows.

When the tool and the steel sheet are slid relative to each other, the lubricant oil held in the indentations is applied with pressure through the tool and then discharged to the sliding surface by that pressure so as to realize an effect of lubrication.

In turn, in case of groove-like indentations, the oil is not enclosed in them, so that the lubricant is simply discharged together with the tool along the groove-like indentations, resulting in no supplying of oil to the most important part. Accordingly, the sliding resistance is high and it is not suitable for press forming.

As regards the influence of the steel sheet manufactured by the shot blast roll in the conventional type of system against the sliding resistance, it can be explained if the projections and indentations in the surface are random in shape and the structure of the projections and indentations is considered as one in which the pond-like indentations and the groove-like indentations are mixedly present with each other. In case of a steel sheet manufactured by the laser dulling roll, its indentation shape is sharp and an edge of the indentation is cut and raised, so that the lubricant is hardly discharged if any pressure occurs. Accordingly, the conventional type of material shows a sliding resistance at the intermediate part of the steel sheet having groove-like indentations and pond-like indentations.

Figure 20:
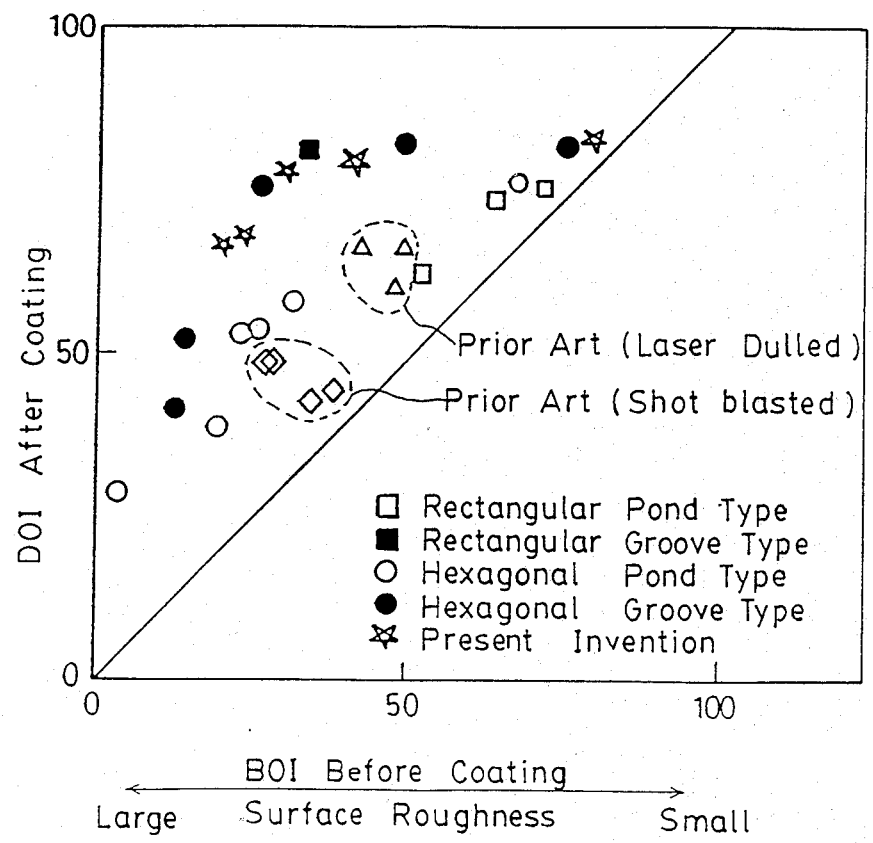
FIG. 20 is a graph showing a result of sharpness of reflection.

Then, the sharpness of reflection characteristic will be described. DOI before and after the coating of these steel sheets is indicated in FIG. 20. A coating condition is set such that after a background part is processed, then an electro-deposition is applied to perform a vertical coating once. As shown in FIG. 20, the material having a high DOI before coating operation shows a high DOI value also after coating is carried out. The material having a high DOI value before coating has a high rate of flat areas and has a low surface roughness.

In FIG. 20, checking of the improved margin of DOI after coating from the same DOI before coating shows that the improved margin of the steel sheet having groove-like indentations is high and the projections and indentations in the surface are easily made uniform. In case of a steel sheet made by a shot blast roll, DOI values before and after coating operations are low and its sharpness of reflection characteristic is deteriorated. In case of the steel sheet obtained through a laser dulling process, the improved margin of DOI value through the coating process is low.

In view of the knowledge obtained through the basic experiment as described above, it is apparent that a pattern having the pond like indentations and the continuous groove-like indentations arranged on the surface of the steel sheet is the superior one as it produces a steel sheet satisfying both press machining characteristics and sharpness of reflection.

As the form of arrangement of this pattern, two cases can be provided. One of them (a case 1) is pattern in which pond-like indentations 51 and groove-like indentations 52 are alternatively arranged as shown schematically in FIG. 11. In performing a press machining operation, the lubricant held within the pondlike indentations 51 in FIG. 11 receives pressure from the tool and is discharged to a flat part 53 where the tool is contacted with the material so as to realize an effective lubricating characteristic. In turn, during a coating operation, the groove like indentations 52 may become a coating flow path, resulting in making a uniform coating and the sharpness of reflection is improved.

Another case (case No. 2) is made such that the pond-like indentations and groove-like indentations are formed on separate positions in the steel sheet in response to the shape of the press formed product.

Figure 14:
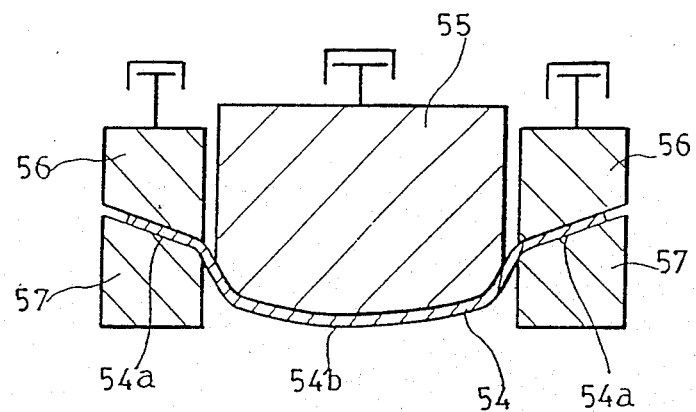
FIG. 14 is a schematic view schematically showing a press machining operation.

In case the steel sheet 54 is press formed, the most important location is a part 54a of the steel sheet contacting the die 57 shown in FIG. 14 and in turn a location where sharpness of reflection characteristic is required is a part 54b of the steel sheet corresponding to a punch surface 55. Accordingly, in case the shape of the formed product is a wellknown one, a pond-like pattern is formed at the steel sheet 54a and the groove-like pattern is formed at the part 54b.

These steel sheets are obtained through skin pass rolling by rolls having projections and identations opposite to those of the steel sheets. In this case, a desired steel sheet can be manufactured through skin pass rolling shown in FIG. 16 by rolls having both indentations of pond like and groove-like form. Otherwise, skin pass rolling is applied with one roll formed with either pond like indentations or groove like indentations and then with another roll formed with either indentations opposite to the former.

A method for applying a preferable pattern to the steel sheet during reskin pass rolling will be described as follows. For example, a steel sheet skin pass rolled once with a roll having a rectangular indentation with one side length (a) is transferred with groove-like indentations so as to enclose the projections with one side (a). Under this condition, although the sharpness reflection characteristic is superior, press rolling workability is not always superior. Accordingly, it is necessary to form only the pond-like indentations separated through the second skin pass at the projections with one side (a) Due to this fact, during second skin pass operation, the roll formed with the groove-like indentations (in other words, the projections with one side (b)) is applied, it is necessary to fulfill the following equation (1). In this equation, l denotes a pitch of the projection and indentation in the second skin pass roll.

$$l+b>a \qquad (1)$$

Figure 21:
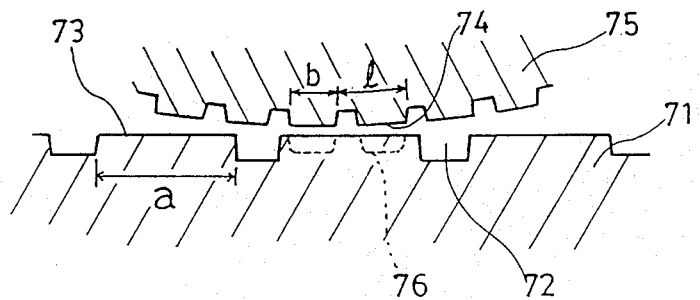
FIGS. 21 and 22 are views in partial section showing a steel sheet and a roll for indicating a double skin pass.

In FIG. 21 is illustrated schematically a positional relationship of these elements. In FIG. 21, the reference numeral 71 denotes a sectional surface of a surface part of the steel sheet obtained through the first skin pass rolling in which a projection 73 with a side length (a) is formed together with the groove like indentations 72. That is, the first time skin pass roll is used with a roll formed with a rectangular indentation with a side length (a).

In case this steel sheet is provided with pond-like indentations 76 with a pitch l and a width (b) spaced apart by using a second skin pass roll 75 having the groove-like projections 74 with a pitch l and a width (b), the above-mentioned equation (1) must be fulfilled.

Figure 22:
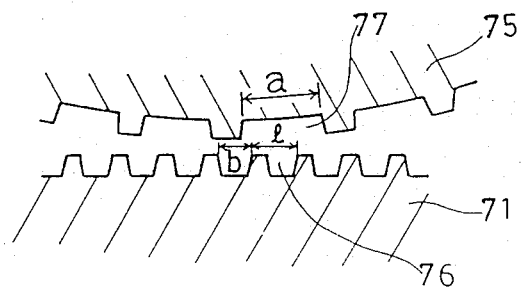

FIG. 22 indicates a case in which the steel sheet 71 obtained through the first skin pass rolling has pond-like indentations 76 spaced apart with a pitch l and a width (b). As shown in FIG. 22, the spaced-apart pond-like indentations 76 with a pitch l and a side (b) are applied to the steel sheet 71 through a first skin pass rolling and then a roll having spaced-apart pondlike indentations 77 with a side (a) so as to fulfill the above-mentioned equation (1) through the second skin pass rolling may also be used.

Then, an appropriate size of these minimum surface pattern will be described.

In order to prevent trouble such as cracks during press forming, it is necessary to keep lubricant in the pond-like indentations. In order to prevent galling of the die as described above, it is necessary to provide indentations to trap the worn powders generated during press working. The lubricant oil stored in the pond-like indentations 51 shown in FIG. 11 flows out to the flat part 53 so as to prevent metallic contact between the flat part 53 and the tool. During this operation, it is assumed that a minimum film thickness of the lubricant oil required at its contacting surface is about 1 μm, and further it is assumed that surface areas of the pond like indentations 51 and the flat part 53 are defined as Sa and Sb, a depth d (μm) of the pond-like indentations 1 can be expressed as follows, $$d \geq (Sb/Sa)$$

That is to say, when the area of the flat portion 53 is larger than that of the pond-like indentations 51, the pond-like indentations are deep and in turn in case the former is opposite to the latter one, it may be shallow. Provided that if the value of Sb/Sa is too high, as described above in reference to the laser dulling roll process, it is likely that a sufficient amount of lubricant oil is not supplied to the flat part 53 and in this case it may be expressed as $$(Sb/Sa) \leq 5.$$

A decreasing of the value (Sb/Sa) may result in an increasing of space for keeping lubricant oil in the pond-like indentations and this is effective in performing press forming. However, in turn the area of the flat surface 53 is decreased and the sharpness of reflection is deteriorated. Provided that if the work passes through the coating process, the sharpness of reflection after coating is improved more under an effect of side grooves.

In this case, it is assumed that this problem is understood as a wide one and even if the coating is not applied, a better sharpness of reflection is assured. According to this technical concept, a relation of $$(Sb/Sa) \geq 0.5$$

is appropriate. So, the following relation of $$0.5 \leq (Sb/Sa) \leq 5.0$$

is appropriate. As regards the depth (d), as described above, a relation of $d \geq (Sb/Sa)$ can be applied. However, if it is assumed that a trap function for iron powder caused by the galling of die is considered, a relation of $d > 2.0$ (μm) is preferable.

Provided that the foregoing is a mere example, and in case that excessive drawing is applied for a bath tub, for example, or when a part of which die galling becomes a quite problem, a relation of $d > 10.0$ (μm) is also generated and in case of a low amount of formation, the value (d) is low and a relation of (Sb/Sa) ≥ 10 is generated.

Figure 11:
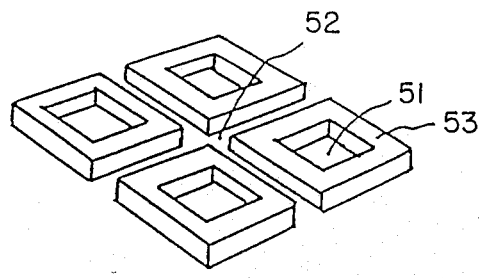
FIG. 11 is a schematic perspective view showing a surface of a metallic steel sheet for press machining work of the present invention.

As regards the shape of the pond-like indentations, a pattern shown in FIG. 11 is naturally one example, and so it is not necessary to restrict it to a rectangular shape. Although the plane surface as described above can be accomplished by using a roll manufactured by an etching process of which one example is illustrated in FIG. 17, its depth is necessarily varied in response to the skin pass rolling condition.

Figure 12:
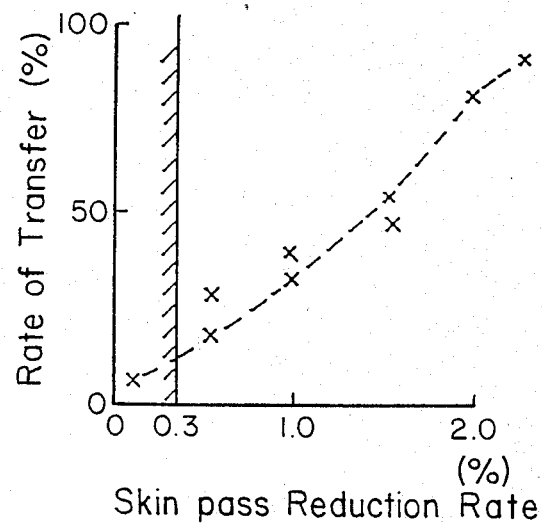
FIG. 12 is a graph showing the influence of a skin pass rolling rate against a transferring rate.
Figure 13:
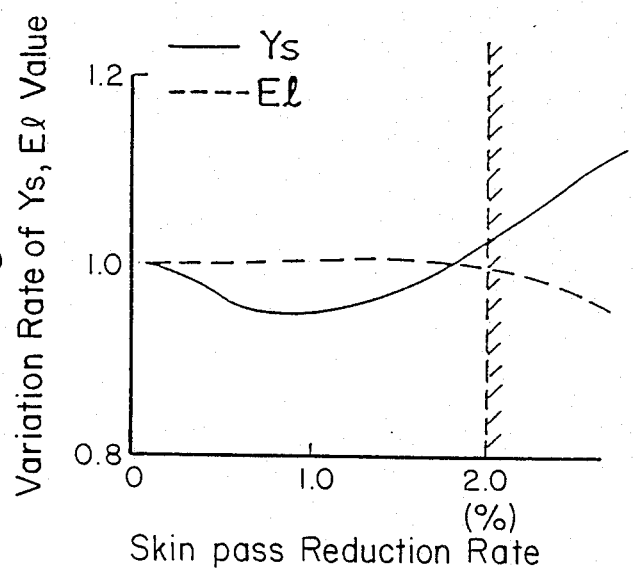
FIG. 13 is a graph showing the influence of a skin pass rolling rate against a mechanical property.

Then, the influence of the skin pass rolling rate will be described. As the skin pass reduction rate is increased, as shown in FIG. 12, the projections and indentations of the roll are deeply transferred to the steel sheet, resulting in that a predetermined shape of projections and indentations of the steel sheet can easily be attained. If the rate of rolling is low, the rate of transfer is low and a predetermined shape may not be attained. Accordingly, it is preferable to have a rate more than 0.3%. Provided that if the rate of reduction is increased, as shown in FIG. 13, a mechanical characteristic of the steel sheet itself (yield stress Ys and elongation El) is deteriorated and press workability is deteriorated. That is, Ys is increased and El is decreased. For the foregoing reasons, it is preferable to perform skin pass rolling within a range of reduction rate shown in FIG. 12, i.e. within a reduction rate of 2.0%.

Then, a characteristic of the steel sheet of the preferred embodiment of the present invention will be described in reference to an example.

Figure 15:
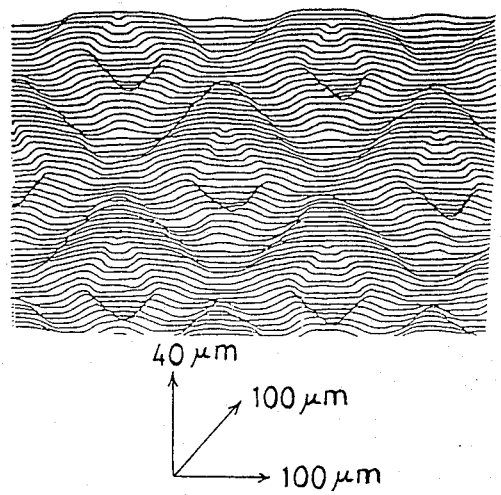
FIG. 15 is a view showing projections and indentations at the surface in a preferred embodiment of the present invention.

One example of a result of the present invention in which a structure having projections and indentations of the present invention is applied to a low carbon aluminum killed steel sheet with a thickness of 0.6 mm is illustrated in FIG. 15. The roll at this time is one in which a cold rolling breight roll (3% Cr steel) is provided with projections and indentations opposite to those of FIG. 15 through the above-mentioned etching. Rz of this roll (a maximum difference in steps of projections and indentations) is 20 μm. As a result of rolling with a reduction rate of 0.6 to 1.5%, the value of Rz of the steel sheet is 4 to 10 μm. Deterioration of mechanical characteristics was also at a level providing no problem at all.

Each of the test results of a sliding test and a coating test by using this steel sheet is indicated in FIGS. 19 and 20, respectively. A sliding resistance for showing a performance of the press forming characteristic is at the same level as that of the pondlike indentations showing a quite low sliding resistance under a preliminary experiment. Also as regards sharpness of reflection, a result of the same level as that of the groove like indentations could be attained.

The thin steel sheet of the present invention has a structure of projections and indentations which is superior in sharpness of reflection after coating and it may easily be manufactured by using a rolling roll transferring the pattern of projections and indentations through a skin pass rolling process.

What is claimed is:
1. A process of forming a micro-pattern on the surface of a rolling roll comprising the steps of:
    (1) forming a film of acid corrosionresistant resin on the rolling roll surface by applying a mixture of an acid corrosion-resistant resin solution and a light-absorbing agent;
    (2) marking off a desired pattern on this film of resin, using a Q-switched YAG laser having an output of 5 to 100 on an average, and exposing the roll surface with the pattern thus marked off; and
    (3) thereafter, performing etching to form the desired pattern on the roll surface.

2. A process of forming a micro-pattern on the surface of a rolling roll according to claim (1) in which the resin film thickness formed on the roll surface is 1 to 10 μm.

3. Apparatus for forming a micropattern on the surface of a rolling roll comprising:
    (a) a roll rotating device for supporting the roll and rotating the same;
    (b) a coating device for coating a resinous substance on said roll surface;
    (c) a laser plotter comprised of a laser oscillator for generating a pulse laser in response to an electrical signal and a device for guiding said laser to the roll surface and focusing the laser;
    (d) an etching device for etching a roll surface processed by said laser plotter;
    (e) a moving device for moving independently or simultaneously each said coating device, laser plotter and etching device axially of the roll;
    (f) an image processing device for forming a pattern to be provided on a roll surface, dividing the pattern into dots to provide a binary encoding and to provide a eries of plot data;
    (g) a detecting device arranged for detecting rotational angle of said roll; and
    (h) a control device connected for controlling pulse ejecting timing of said laser plotter in response to a signal sent from said detecting device for detecting rotational angle of the roll and in response to said plot data from said image processing device.

4. An equipment for forming a micro-pattern on the surface of a rolling roll according to claim 3 in which;
    the laser plotter is provided with an YAG laser oscillator, a first optical modulator arranged between two resonant mirrors in said laser oscillator, and a second optical modulator arranged midway of a laser beam path out of the laser oscillator;
    the roll rotating device is provided with a device for detecting rotational angle of the roll composed of a rotary encoder; and
    the control device is provided with an optical modulator driver for driving said first optical modulator in response to a clock signal of said rotary encoder, and with an optical modulator driver for driving said second optical modulator in response to a signal taken out of a portion corresponding to a dot required for making said image from said clock signal in reference to the plot data.

5. An equipment for forming a micro-pattern on the surface of a rolling roll according to claim (3) or (4) in which the laser plotter is provided with a spectroscope for dividing a laser beam into a plurality of lines between the laser oscillator and the second optical modulator and further with a plurality of second optical modulators in correspondence with the number of divided laser beams.

6. A metallic sheet for use in press forming having on the surface thereof a micro-pattern composed of independent pond-shaped indentations and continuous grooved indentations, said grooved indentations enclosing the pond-shaped indentations and being arranged to form a network.

7. A roll for rolling metallic sheet for press forming comprising a surface pattern composed of flat topped independent trapezoid projections and a network of flat topped continuous projections surrounding said independent trapezoid projections.

8. A method for preparing a metallic sheet for press forming comprising the steps of skin pass rolling a part of a sheet metal blank by using a roll having a micro-pattern composed of independent trapezoid projections, and skin pass rolling another part of the blank by using another roll having a micro-pattern composed of a network of projections.

9. A method for preparing a metallic sheet for press forming comprising:
   skin pass rolling a sheet metal blank by using a roll which provides a surface pattern composed of flat topped independent trapezoid projections and a network of flat topped continuous projections surrounding said independent trapezoid projections, and
   said step of skin pass rolling being controlled such that the reduction rate of the blank is 0.3 to 2%.

10. A metallic sheet for use in press forming having on the surface thereof a micro-pattern composed of independent pondshaped indentations and continuous groove-shaped indentations, said pond-shaped indentations being arranged on a part of the sheet surface, said groove-shaped indentations being arranged on another part of the sheet surface and being arranged to form a network.

11. A method for preparing a metallic sheet for press forming comprising the steps of:
   skin pass rolling a sheet metal blank by using a roll having a micro-pattern composed of independent trapezoid projections; and
   skin pass rolling the blank by using another roll having a micro-pattern composed of a network of continuous projections having a larger aperture than the sum of the width and the pitch of said independent trapezoid projections;
   said steps of skin pass rolling being carried out in such a manner that discrete pond-shaped indentations formed by said trapezoid projections are surrounded by continuous grooveshaped indentations formed by said continuous projections.

* * * * *